United States Patent [19]

Aab

[11] Patent Number: 5,500,585
[45] Date of Patent: Mar. 19, 1996

[54] DEVICE FOR DETECTING THE SPEED AND DIRECTION OF A MOVABLE COMPONENT USING A SINGLE SIGNAL LINE

[75] Inventor: Volker Aab, Sasbach, Germany

[73] Assignee: Robert Bosch GmbH, Stuttgart, Germany

[21] Appl. No.: 138,093

[22] Filed: Oct. 20, 1993

[30] Foreign Application Priority Data

Oct. 21, 1992 [DE] Germany ............... 42 35 471.4
Mar. 13, 1993 [DE] Germany ............... 43 08 031.6

[51] Int. Cl.$^6$ ............... G01P 3/52; G01P 13/00; G01B 7/14; G08B 21/00
[52] U.S. Cl. ............... 324/165; 324/207.2; 340/672
[58] Field of Search ............... 324/165, 173, 324/174, 207.2, 207.21, 207.25; 340/672

[56] References Cited

U.S. PATENT DOCUMENTS

| | | | |
|---|---|---|---|
| 3,728,565 | 4/1973 | O'Callaghan | 324/165 |
| 4,629,982 | 12/1986 | Kieslich | 340/672 |
| 4,785,242 | 11/1988 | Vaidya et al. | |

FOREIGN PATENT DOCUMENTS

| | | |
|---|---|---|
| 0473068A1 | 3/1992 | European Pat. Off. . |
| 2625686B1 | 11/1977 | Germany . |
| 2824697B1 | 10/1979 | Germany . |
| 3020276A1 | 12/1980 | Germany . |
| 3834591A1 | 4/1990 | Germany . |
| 9012217 U | 12/1990 | Germany . |

OTHER PUBLICATIONS

Philips Semiconductors, "KMI 10/1 Integrated Rotational Speed Sensor", *Philips*, SC 17, Sep. 1992, pp. 2–12.
U. Tietze et at, "Halbleiterschaltungstechnik" (Semiconductor Circuit Technology), *Springer Verlang*, 5th Edition, 1980, pp. 54 and 112.
Tietze et al., "Halbleiter–Schaltungstechnik Fünfte, überarbeitete Auflage" Springer–Verlag, (1980), pp. 54 and 112. (no translation).

*Primary Examiner*—Walter E. Snow
*Attorney, Agent, or Firm*—Spencer & Frank

[57] ABSTRACT

A device for detecting the movement of a movable component in that the position signals furnished by two position sensors are added to a signal that is conducted through a signal line to an evaluation arrangement. The position ranges associated with the position sensors have an overlapping region. From the position signals, a signal processing arrangement determines a direction signal and a speed signal. Two current sources are actuated by the direction signal and the speed signal to impress predetermined currents in the signal line. The currents are added in the signal line. In a first embodiment, a signal transmitted over the signal line has four different levels. In another embodiment, the signal transmitted over the signal line has three different levels. The device according to the present invention is particularly suitable for use in an adjustment drive provided in a motor vehicle.

13 Claims, 6 Drawing Sheets

FIG. 7

DEVICE FOR DETECTING THE SPEED AND DIRECTION OF A MOVABLE COMPONENT USING A SINGLE SIGNAL LINE

CROSS REFERENCE TO RELATED APPLICATION

This application is related to commonly owned U.S. patent application Ser. No. 08/138,208, filed concurrently by H. Seiler et al.

BACKGROUND OF THE INVENTION

The present invention is based on a device for detecting the movement of a movable component of the type including a first position sensor which puts out a signal that is assigned to a first position range and a second position sensor which puts out a signal that is assigned to at least a second position range.

The in-house publication by PHILIPS, Philips Semiconductors, entitled KMI 10/1 Integrated Rotational Speed Sensor, SC 17, September 1992, discloses a sensor which detects the number of revolutions of a rotating component. The sensor element employed is a Hall sensor whose output signal is fed to a signal processing arrangement. The signal processing arrangement includes a filter for suppressing electromagnetic interference signals, an amplifier and a Schmitt trigger. The output signal of the Schmitt trigger switches a current source which admits a defined current between two current supply terminals. A further current source is included in the energy supply circuit of the sensor. The further current source keeps the current required to supply the sensor with energy at a constant value. An evaluation arrangement, not described in greater detail, evaluates the current flowing through one of the two current supply lines. The evaluation arrangement converts the change in current impressed by the switched current source in one of the current supply lines into a number of revolutions signal.

German Utility Model Patent DE-U 90 12 217.8 discloses an arrangement which includes an electric motor drive for opening and closing the windows in a motor vehicle. A central device equipped with control and evaluation arrangements is connected with several drive units which are disposed in the doors of the motor vehicle. The drive units include an electric motor and a sensor arrangement. The sensor arrangement detects the number of revolutions of the drive. Five connecting lines are provided between the central device and each drive unit for the transmission of signals and energy.

SUMMARY AND ADVANTAGES OF THE INVENTION

It is an object of the present invention to simplify the cabling efforts in a device for detecting the movement of a movable component, with the device being of the type which includes a first component provided with a sensor arrangement, and a second component which is separated or remote from the first component and which includes an evaluation arrangement.

The above object generally is achieved according to the present invention by a device for detecting the movement of a movable component, with the device including a first position sensor which puts out a signal that is assigned to a first position range and a second position sensor which puts out a signal that is assigned to at least a second position range, wherein the two position ranges have an overlapping region, the respective signals output by the two sensors are fed to a signal processing arrangement which derives a direction signal (R) and a speed signal (G) from the two sensor output signals, the direction signal (R) and the speed signal (G) are assigned discrete values which are added together and are fed through a signal line to an evaluation arrangement.

The device according to the invention has the advantage that only one signal line is required to transmit signals between a sensor arrangement which puts out a direction signal and a speed signal and an evaluation arrangement. The signal processing arrangement included in the sensor arrangement determines the direction signal and the speed signal, each being assigned discrete values, from the signals put out by the at least two position sensors. The assignment of discrete values facilitates signal processing in the sensor arrangement by means of switched current sources or switched voltage sources. The added values are transmitted over the signal line. The signal transmission from the sensor arrangement to the evaluation arrangement is thus fixed to a minimum of three discrete signal levels. With this measure it is possible to realize great strength against interference signals. This signal transmission is advantageous particularly if the signal is further processed in a digital manner, for example by means of comparators.

Advantageous modifications and embodiments of the device according to the invention are defined in the dependent claims.

In a first advantageous embodiment at least approximately equal values are assigned to the direction signal and the speed signal. By including an addition of the two values, three different signal levels result which are transmitted over the signal line. With a given maximum voltage level or a given maximum current, it is possible to obtain the best useful signal to noise signal ratio with this measure.

In another advantageous embodiment of the invention, different values are assigned to the direction signal and the speed signal. Preferably, one signal is assigned the double value of the other signal. With this measure, it is easy to determine the direction and speed information in the evaluation arrangement. In this embodiment, four different signal levels are transmitted over the signal line.

In one advantageous embodiment, the position sensors are configured as magnetic field sensitive elements. Particularly suitable are Hall effect elements which are available at a favorable price and are highly reliable in operation.

The signal transmission between the sensor arrangement and the evaluation arrangement can be effected by means of an impressed voltage signal or an impressed current signal. The impressing of the current signal, preferably by means of two switched current sources, has the advantage that coupled-in interference voltages or, for example, different reference potentials between evaluation and sensor arrangements have no influence on the transmission.

A modification of the signal transmission with impressed current provides for the use of a current mirror circuit in the evaluation arrangement. The current mirror circuit permits precise conversion of the current signal into a voltage signal which is more easily managed in the further evaluation than a current signal.

Another modification relates to supplying the sensor arrangement and, insofar as necessary, the position sensors with energy. This modification provides for the inclusion of the cables for an electric motor which drives the movable component.

According to a first embodiment of the modification, the energy supply of the sensor arrangement is provided by way of the signal line and by way of at least one of the lines leading to the electric motor. In this embodiment, the current flowing in the signal line is composed of the current for the energy supply for the sensor arrangement and the current provided for the signal transmission. The advantage of this first embodiment is that, with a given short-circuit in the electric motor as actuated by a control device provided for controlling the motor in order to quickly brake it, the energy supply for the sensor arrangement through lines leading to the motor is ensured without further measures. A possibly provided energy reservoir associated with the sensor arrangement can therefore have small dimensions or be omitted entirely.

An alternative embodiment provides for supplying energy to the sensor arrangement by way of the two lines leading to the electric motor. This embodiment is particularly suitable for predetermining an impressed voltage in the signal line for signal transmission, with the voltage being determinable independently of any other required supply voltage.

The device according to the present invention for detecting the movement of a movable component is particularly suitable for use in an adjustment drive preferably arranged in motor vehicles. The small number of connecting lines between the first component and at least one second component results in savings of costs in mass production and increased ease of access.

Further advantageous features and improvements of the device according to the invention are defined in the further dependent claims.

BRIEF DESCRIPTION OF THE DRAWINGS

The device according to the present invention for detecting the movement of a movable component will be described below in greater detail with reference to the drawing figures.

DETAILED DESCRIPTION OF THE PREFERRED EMBODIMENTS

Figure 1:
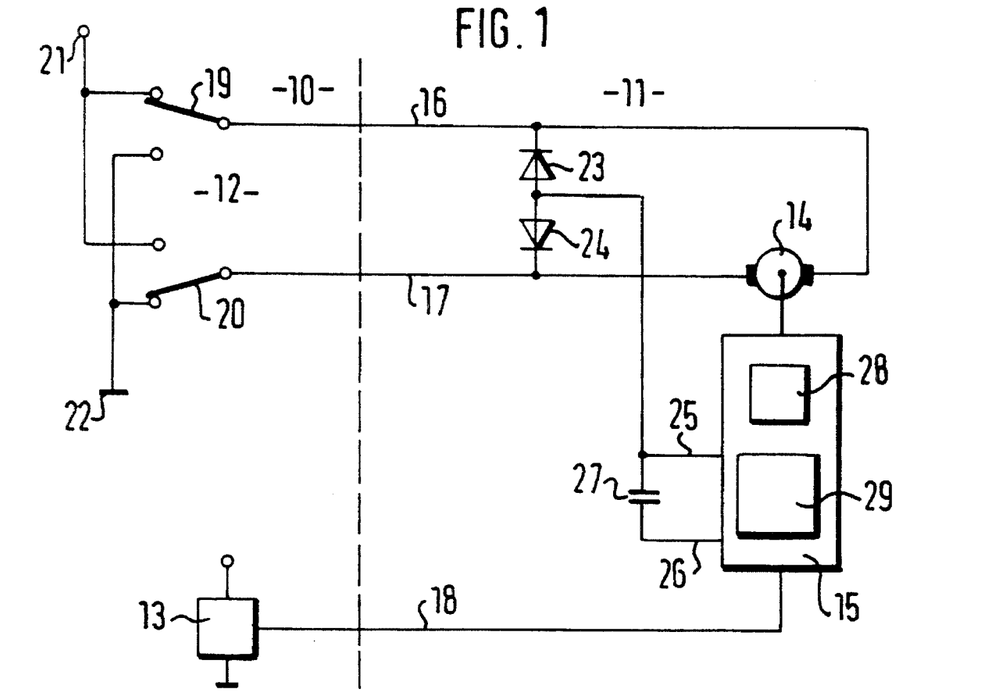
FIG. 1 depicts an embodiment of a device according to the invention for detecting the movement of a movable component.

FIG. 1 shows an electric motor drive composed of a first component 10 and a second component 11 which is separated or remotely spaced from the first component 10. The two components 10 and 11 are shown separated from each other by a dashed line. The first component 10 includes a control arrangement 12 and an evaluation arrangement 13. The second component 11 includes an electric motor 14 and a sensor arrangement 15.

The control arrangement 12 is connected with the electric motor 14 disposed in the second component 11 by means of two connecting lines 16 and 17. A third line 18, hereinafter called the signal line, connects the evaluation arrangement 13 included in first component 10 with the sensor arrangement 15 included in the second component 11.

Control arrangement 12 includes a first switching means 19 and second switching means 20 which selectively connect each of the connecting lines 16 and 17 either with an operating voltage terminal 21 or to ground 22. Connecting lines 16 and 17 are each connected with a rectifier diode 23 and 24, respectively, whose anodes are each connected with a first current supply terminal 25 of sensor arrangement 15. A capacitor 27 is connected between the first current supply terminal 25 and a second current supply terminal 26 of the sensor arrangement 15. Sensor arrangement 15 includes a sensor 28 which is in operative connection with electric motor 14 or with the component driven by electric motor 14. Sensor arrangement 15 further includes a signal processing arrangement 29.

Figure 2:
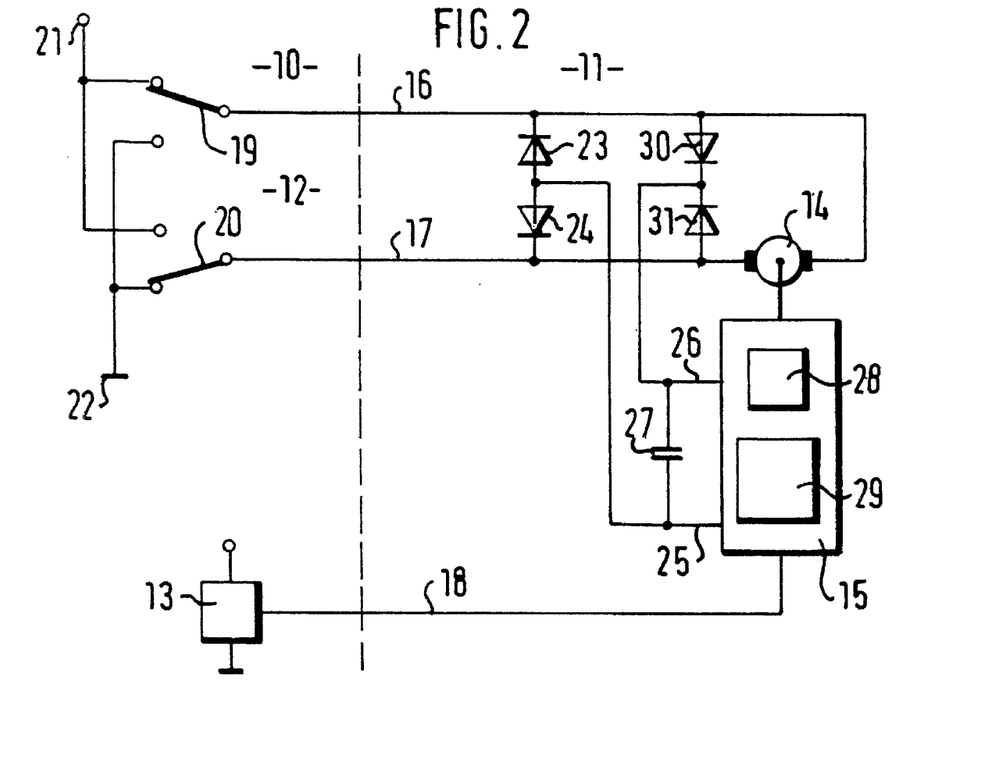
FIG. 2 depicts another embodiment of a device according to the invention for detecting the movement of a movable component.

In the block circuit diagram shown in FIG. 2 for the electric motor drive including the two components 10 and 11, those components which coincide with components shown in FIG. 1 are given the same reference numerals. In this embodiment the second current supply terminal 26 of sensor arrangement 15 is connected by way of further rectifier diodes 30 and 31 with the respective connecting lines 16 and 17. The second current supply terminal 26 is connected with the respective cathode terminals of diodes 30 and 31.

Figure 3:
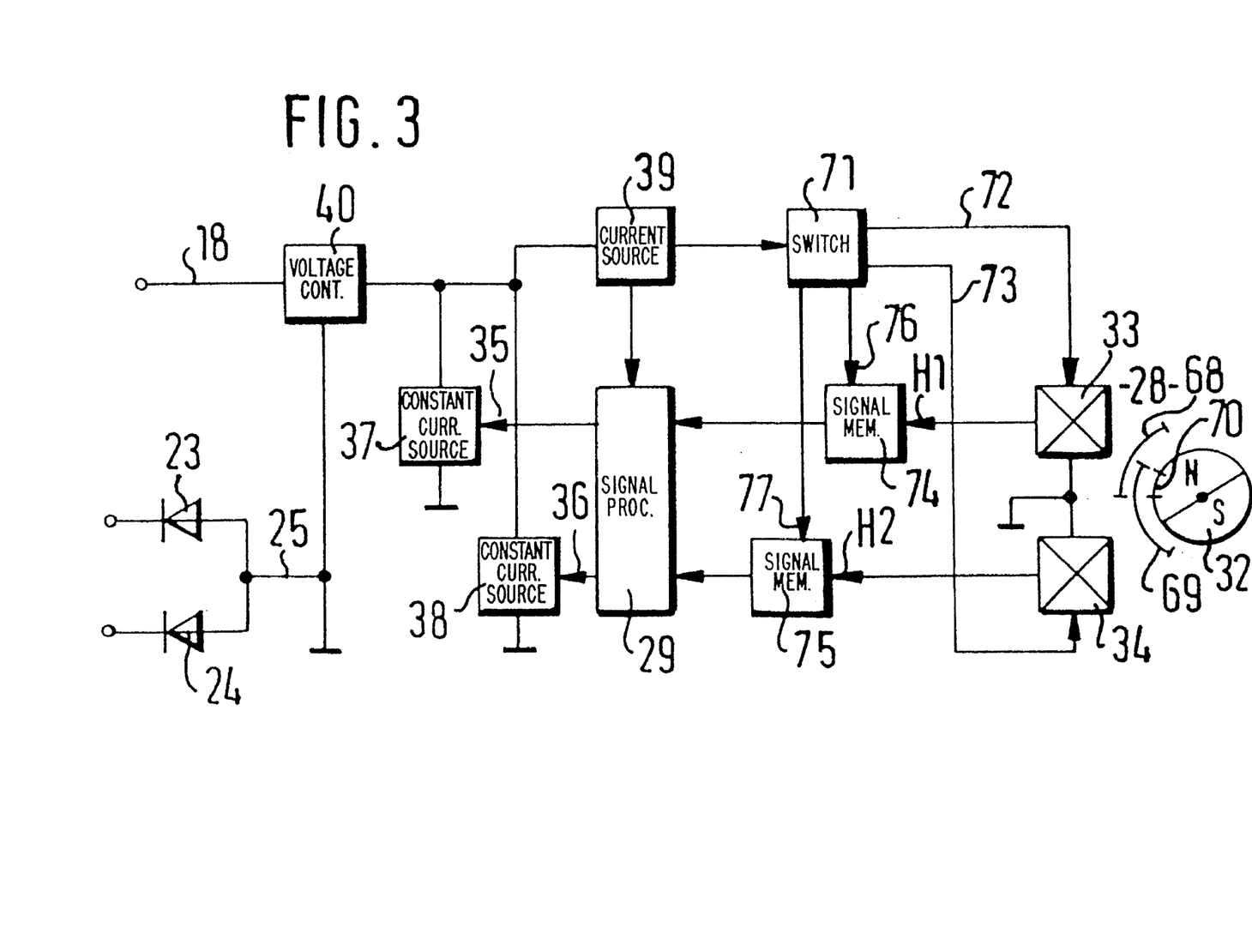
FIG. 3 depicts an embodiment of a sensor arrangement.

FIG. 3 depicts an embodiment of the sensor arrangement 15 shown in FIGS. 1 and 2. Sensor 28 includes at least one permanent magnet 32 driven directly or indirectly by electric motor 14 and cooperating with a first magnetic field sensitive element 33 and a second magnetic field sensitive element 34. The first element 33 puts out a first position signal H1 for a first signal memory 74. The first position signal H1 is associated with a first position range 68. The second element 34 puts out a second position signal H2 for a second signal memory 75. The second position signal H2 is associated with a second position range 69. Position ranges 68 and 69 overlap in a region 70. Output signals from the two signal memories 74 and 75 are fed to signal processing arrangement 29 which makes available control signals 35 and 36 for controlled current sources 37 and 38, respectively.

A further current source 39 is provided to supply magnetic field sensitive elements 33 and 34 and signal processing arrangement 29 with energy. The further current source 39 supplies energy to a switch 71 which conducts the energy through lines 72 and 73 to the respective magnetic field sensitive elements 33 and 34. Switch 71 also feeds memory signals 76 and 77 to signal memories 74 and 75. Signal line 18 leads to a voltage controller 40 whose output is connected with current sources 37 and 38 and with the further current source 39. Voltage controller 40 is also connected with the first current supply terminal 25 which leads to the anode terminals of rectifier diodes 23 and 24. Diodes 23 and 24 are shown again in FIG. 3 to illustrate that the magnetic field sensitive elements 33 and 34 shown in FIG. 3 including diodes 23 and 24, 30 and 31, and the other function blocks shown in FIG. 3, except for permanent magnet 32, may be accommodated within an integrated circuit.

Figure 4:
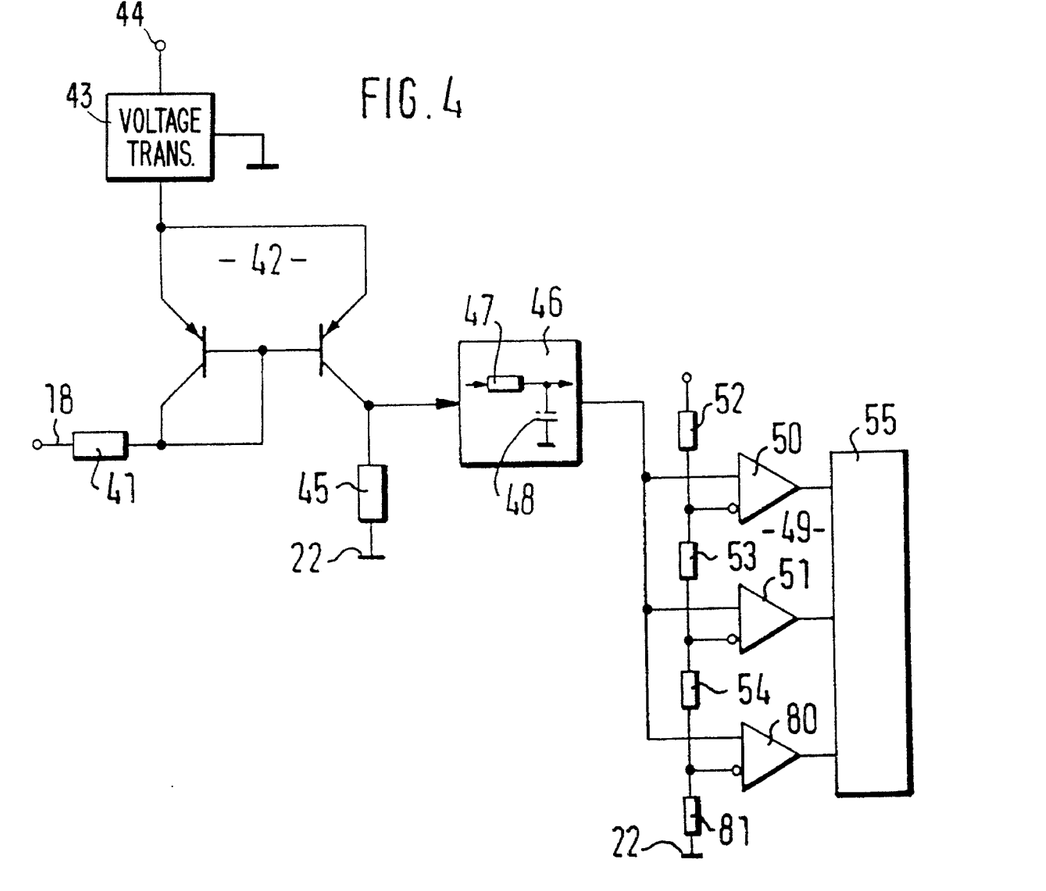
FIG. 4 depicts an embodiment of an evaluation arrangement.

FIG. 4 depicts an embodiment of evaluation arrangement 13. Signal line 18 leads by way of a resistor 41 to a current mirror circuit 42. The energy source is a voltage transformer circuit 43 which transforms the voltage applied across a current supply terminal 44 to a higher potential. A voltage which corresponds to the current flowing in signal line 18 appears across an operating resistor 45 at the output of the current mirror circuit 42. The voltage signal appearing at operating resistor 45 is fed by way of a lowpass filter arrangement 46, including the combination of a resistor 47 and a capacitor 48, to a comparator arrangement 49. Comparator arrangement 49 includes three differential amplifiers 50, 51 and 80 whose inverting inputs are each connected with a resistance dividing chain of four resistors 52, 53, 54 and 81. The non-inverting inputs of differential amplifiers 50, 51 and 80 are connected with the output of the lowpass filter 46. Differential amplifiers 50, 51 and 80 feed their output signals to a microprocessor 55.

Figure 5:
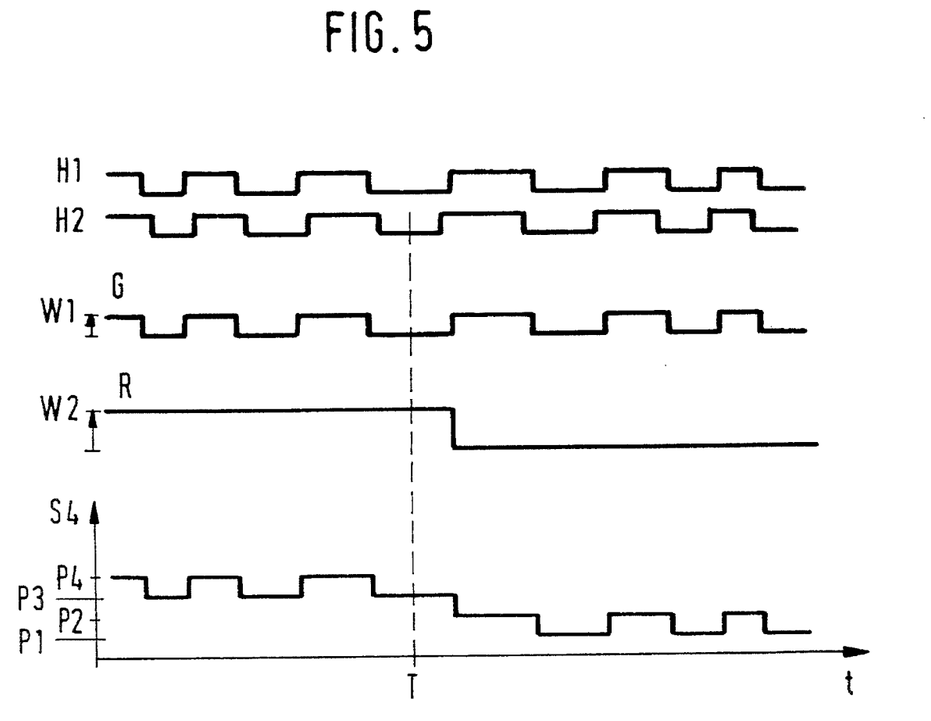
FIG. 5 shows signal curves as a function of time for signals appearing in the sensor arrangement.
Figure 6A:
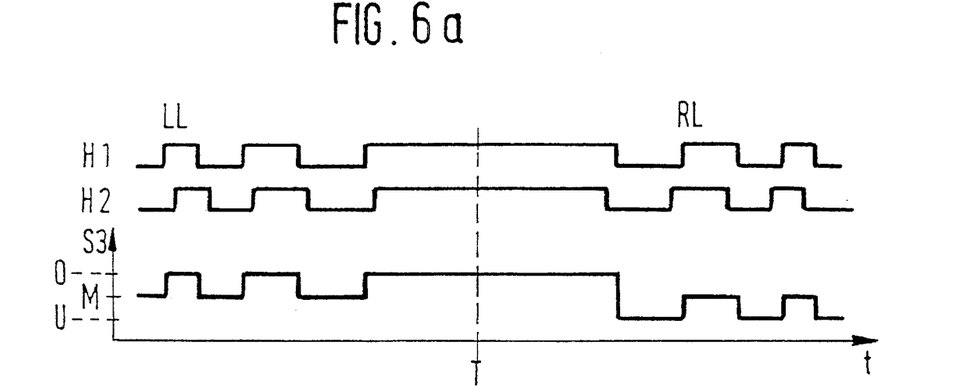
FIGS. 6a to 6d also show signal curves as a function of time for signals appearing in the sensor arrangement.
Figure 6B:
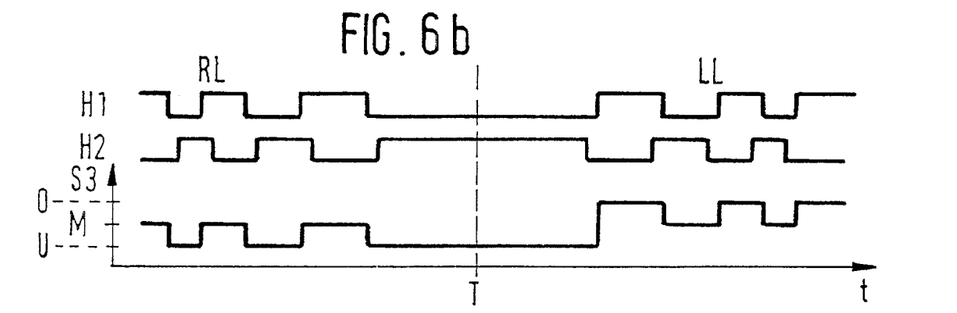
Figure 6C:
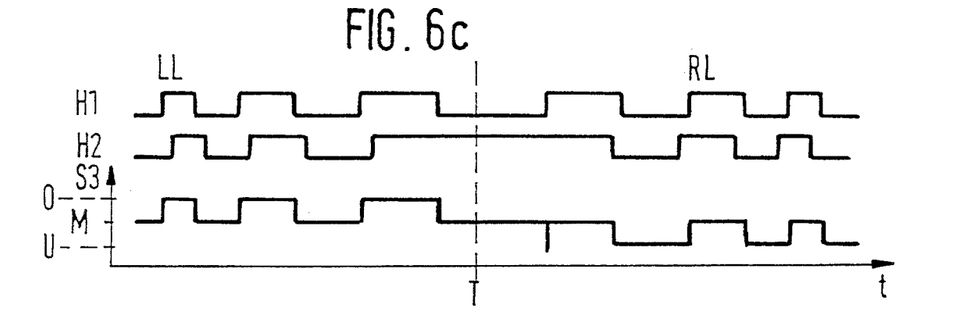
Figure 6D:
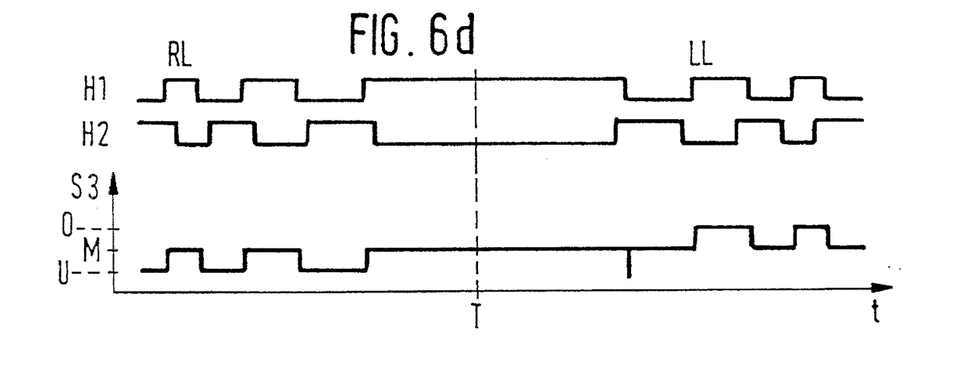

FIG. 5 shows a signal S4 transmitted over the third or signal line 18. Signal S4 is the result of the addition of a speed signal G and a direction signal R. Speed signal G has a value W1 and direction signal R has a value W2. By adding signals G and R, four different levels P1 to P4 of signal S4 result. The signal processing arrangement 29 derives the speed signal G and the direction signal R from the two signals H1 and H2 put out by the respective magnetic field sensitive elements 33 and 34.

The momentary time T entered in FIG. 5 indicates the moment at which the movable component or electric motor 14 changes its direction of movement.

FIGS. 6a to 6d each show a signal S3 transmitted through signal line 18. Compared to the signal S4 shown in FIG. 5, which has four different levels P1 to P4, signal S3 is based on three different levels. An upper level is marked O, a middle level is marked M and a lower level is marked U. FIGS. 6a to 6d also show the associated signals H1 and H2. At time T, the movable component, or at least electric motor 14, changes its direction of movement.

Figure 7:
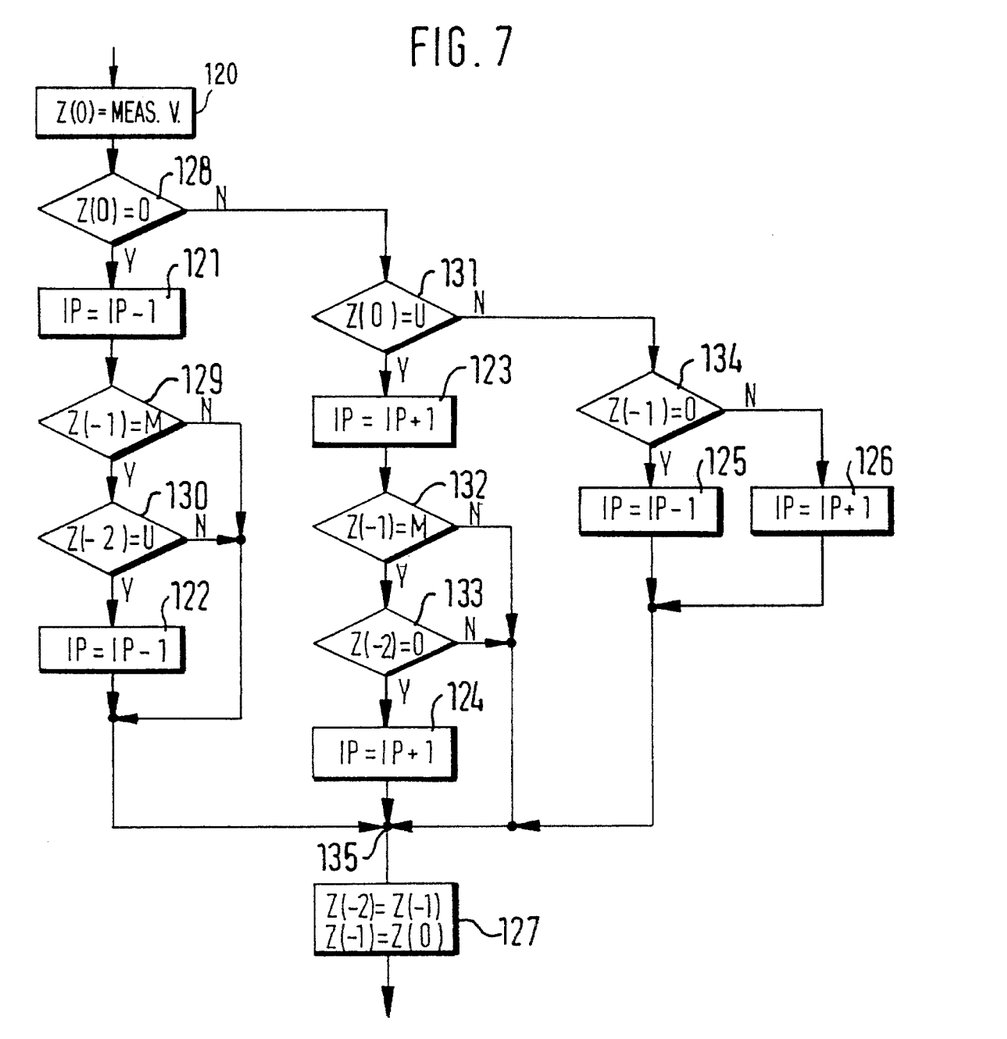
FIG. 7 is a flow chart for a process taking place in the evaluation arrangement.

The flow chart shown in FIG. 7 includes assignment steps 120 to 127, query steps 128 to 134 and a jump goal 135. The signal levels Z entered in the assignment and query stages indicate the respective signal levels at different times for the signal S3 shown in FIG. 6. The values for Z may therefore be O, M or U. The parenthetical numbers entered for signal levels Z indicate at which time this signal level Z was present. Z(0) is the current signal level present after the last level jump of signal S3. Signal level Z(-1) corresponds to the last signal level that was present after the penultimate level jump of signal S3 and signal level Z(-2) corresponds to the penultimate signal level that was present after the signal level jump of signal S3 before the penultimate level jump. IP indicates a current actual position determined in evaluation arrangement 13. The method realized on the basis of the flow chart of FIG. 7 will be described in greater detail below.

First the operation of the device for detecting the movement of a movable component as shown in FIGS. 1 and 2 will be described.

The control arrangement 12 included in first component 10 as well as the evaluating arrangement 13 are accommodated, for example, in a central device to which at least one second component 11 is connected. The second component 11 is preferably contained in a housing which also accommodates the electric motor 14 and the sensor arrangement 15 installed in the immediate vicinity 10 of the motor. Connecting lines 16 and 17 as well as signal line 18 lead to each connected second component 11.

Control arrangement 12 serves the purpose of providing the operating voltage across the connecting lines 16 and 17 for electric motor 14 in such a way that electric motor 14 can be operated in the one or the other direction of rotation. Control arrangement 12 includes the two switching means 19 and 20 which connect connecting lines 16 and 17 either with the operating voltage terminal 21 or to ground 22. Switching means 19 and 20 may also be operated in such a way that both connecting lines 16 and 17 can be switched by switching means 19 and 20 either simultaneously to ground 22 or simultaneously to operating voltage terminal 21. Electric motor 14 can thus be short-circuited. Thanks to this measure, it is possible to quickly brake electric motor 14.

The electric motor 14 in second component 11 is provided to drive a movable component not shown in greater detail. Such a movable component is, for example, a component of an adjustment drive preferably provided in a motor vehicle. The movable component is, for example, an antenna, a folding convertible roof, a window, a rear view mirror, part of a seat and/or a sunroof.

Signal transmission from the second component 11 to the first component 10 takes place through signal line 18. Transmitted is either signal S4 (FIG. 5) or signal S3 (FIG. 6) with which evaluation arrangement 13 is able to determine the movement of the movable component. The permanent magnet 32, which may be provided in magnetic sensor 28 is either connected with the movable component or, preferably, directly with the motor shaft or a transmission shaft. Evaluation arrangement 13 derives the direction and the speed information from signals S4 or S3. If the movement is translatory, one direction and one speed can be put out directly. If the movement is rotational, the direction of rotation corresponds to direction signal R and the angular velocity or the number of revolutions corresponds to speed signal G. The evaluation arrangement is able to determine the actual position IP of the movable component from the direction signal R and the speed signal G. In dependence on the determined signal, for example, electric motor 14 is actuated in the one or in the other direction. For example, a number of revolution signal G and a rotation direction signal R may also be realized to protect against jamming to prevent the catching of objects or body parts between the movable component and another, also non-illustrated, fixed component.

The signal processing arrangement 29 included in sensor arrangement 15 generally requires an energy supply. Sensor 28 also frequently requires its own energy supply. The magnetic field sensitive elements 33 and 34 may also have an energy requirement. For a magnetic field sensitive element based on the Hall effect, a current must be made available. Magnetoresistive elements must also be traversed by a current in order to provide a sensor signal.

In the embodiment shown in FIG. 1, energy is supplied to sensor arrangement 15 by way of the signal line 18 and by way of at least one of the two connecting lines 16 or 17. The first current supply terminal 25 of sensor arrangement 15 is connected by way of the diodes 23 and 24, which act as rectifiers, with the connecting lines 16 and 17 leading to the electric motor 14. Initially it is ensured during operation of the electric motor 14 that the required potential is present in one of the two connecting lines 16 and 17. In the illustrated embodiment, it is the negative potential. Energy supply is also ensured when electric motor 14 is standing still because the switching means 19 and 20 connect at least one of the two lines 16 or 17 to ground 22, with ground 22 corresponding to the negative potential. In the case where electric motor 14 is short-circuit to ground 22, both lines 16 and 17 carry negative potential. The positive potential is supplied to sensor arrangement 15 by way of signal line 18. Evaluation arrangement 13 connects signal line 18 by way of a circuit, which will be described in greater detail in connection with the description of FIG. 4, with a current supply terminal that has the matching positive potential. If necessary, a capacitor 27 is provided which is able to store energy. Capacitor 27 is connected between the first current supply terminal 25 and the second current supply terminal 26 of sensor arrangement 15. The second current supply terminal 26 may, for example, be internally connected directly with signal line 18. It may be necessary for energy to be stored in capacitor 27 for a short period of time in an operating state in which, in order to brake electric motor 14, the two switching means 19 and 20 connect the two connecting lines 16 and 17 simultaneously with operating voltage terminal 21 which carries positive potential. In this case, capacitor 27 must make energy available to sensor arrangement 15 until electric motor 14 is braked. If other measures are taken, which will be described in greater detail in connection with the circuit diagram shown in FIG. 4, capacitor 27 may be omitted entirely in this operating case as well.

The difference between the electric motor drive embodiments shown in FIG. 1 and FIG. 2 is essentially that, in the embodiment shown in FIG. 2, the energy for sensor arrangement 15 is supplied entirely through the two connecting lines 16 and 17 leading to electric motor 14. Rectifier diodes 23 and 24 make available a negative potential at the first current supply terminal 25 and rectifier diodes 30 and 31 provide a positive potential at the second current supply terminal. The supply with energy is always ensured during operation of electric motor 14. In order to be able to have a sufficiently large energy reserve even if it is intended to short-circuit electric motor 14, energy storage capacitor 27 is required whenever sensor arrangement 15 is to transmit signals to evaluation arrangement 13 also during braking of electric motor 14. In the embodiment of the electric motor drive shown in FIG. 2, sensor arrangement 15 impresses the voltage into signal line 18. This configuration is possible because signal line 18 is now required only for signal transmission from second component 11 to first component 10. Another advantage of this embodiment is the selective determination of the signal levels to be transmitted through signal line 18, regardless of whether current or voltage is involved, to permit easy and reliable evaluation.

The sensor arrangement 15 shown in FIG. 3 is based, for example, on a magnetic field sensor as sensor 28. Sensor 28 and its two magnetic field sensitive elements 33 and 34, preferably Hall effect elements, put out position signals H1 and H2 to signal memories 74 and 75 as a function of the position of permanent magnet 32. Position signals H1 and H2 are fed to signal memories 74 and 75 for storage for a predetermined period of time as a function of memory signals 76 and 77, respectively. Memory signals 76 and 77 are made available by switch 71 which also controls the energy supply of magnetic field sensitive elements 33 and 34 by way of lines 72 and 73. The current consumption of magnetic field sensitive elements 33 and 34, which are realized as Hall effect sensors, is essentially determined by the transverse current in elements 33 and 34. Switch 71 switches the supply voltage between the two elements 33 and 34 in periodic time intervals. Signal evaluation occurs only in the element 33 or 34 which is presently supplied with energy. During the time the other element 33 or 34 is supplied with energy, position signals H1 and H2 are intermediately stored in signal memories 74 and 75, respectively. The synchronous actuation of signal memories 74 and 75 with the switching of the energy supply occurs in switch 71. The frequency for switching the energy supply between magnetic field sensitive elements 33 and 34 should be selected to be at least twice as high as the frequency of the expected changes in state of sensor 28. The significant advantage of this measure is the reduction of the total energy consumption which is noted to particular advantage in the concomitant reduction of the current to be transported through signal line 18.

By way of its control signals 35 and 36, signal processing arrangement 29 provides either the voltage present across signal line 18 or the current flowing through signal line 18. In the illustrated embodiment, signal processing arrangement 29 actuates two current sources 37 and 38 which are permanently set either to the same or to different, discrete current values. For the transmission of signal S3, the same discrete current values must be given. For the transmission of signal S4, one of the current sources 37 or 38 gives a discrete current value that is twice that of the other current source 37 or 38. Signal processing arrangement 29 includes, for example, amplifier circuits, comparators, filter circuits for the suppression of interference and driver circuits. Additionally, signal processing arrangement 29 includes means for making available the speed signal G and the direction signal R. Speed signal G and direction signal R are derived from signals H1 and H2 shown in FIGS. 5 and 6. In the embodiments shown in FIGS. 5 and 6, speed signal G is identical with signal H1 whose changes appear in signal S4 or S3. Direction signal R is determined upon a change in level, in the illustrated embodiment if there is a positive edge, as a function of the presently existing level of signal H2. The currents provided by sources 37 and 38 are added in signal line 18 which then carries either signal S3 or signal S4. When predetermining the current flowing in signal line 18, it is necessary for the current required to supply signal processing arrangement 29 and magnetic field sensitive elements 33 and 34 with energy to have a known value which can be considered in evaluation arrangement 13. For that reason, the further current source 39 is advantageously disposed in sensor arrangement 15 to keep the supply current independent of the voltage.

An advantageous embodiment provides for the use of a voltage controller 40. Voltage controller 40 gives, on the one hand, a fixed operating voltage for sensor arrangement 15 and magnetic field sensitive elements 33 and 34. On the other hand, it reduces the influence of interfering voltages. Such interferences are, for example, negative pulses which are coupled into sensor arrangement 15 by way of diodes 23 and 24 when electric motor 14 is shut off.

The embodiment of evaluation arrangement 13 shown in FIG. 4 includes, at its input, a current mirror circuit 42 which converts the current flowing through signal line 18 into a corresponding output voltage across operating resistor 45. A resistor 41 provided at the input end limits the current flowing through signal line 18 to a maximum value that is a function of the operating voltage and thus performs a protective function. Current mirror circuit 42 is described in greater detail, for example, in the textbook by U. Tietze and Ch. Schenk, "Halbleiterschaltungstechnik" [Semiconductor Circuit Technology], 5th Edition, published in 1980 by Springer Verlag, pages 54 and 112, so that a detailed description of the circuit is not necessary here. The signal appearing at operating resistor 45 is fed through lowpass filter arrangement 46 to comparator arrangement 49. The lowpass filter arrangement 46 which, in the simplest case, is realized as a lowpass filter of the first order in the form of a combination of a resistor 47 and a capacitor 48, reduces any possibly coupled-in high frequency interference to a harmless dimension. Instead of a first order lowpass filter it is also possible to provide a higher order lowpass filter or a bandpass filter circuit. The comparator circuit 49 makes possible the detection of either the three or the four different signal levels P1 to P4 or O, M and U. In the embodiment of FIG. 4, three comparators 50, 51 and 80 are provided which permit the detection of four different signal levels. If signal S3 is transmitted, which has only three different levels, one comparator, for example comparator 80, may be omitted. The individual levels are determined by resistors 52, 53, 54 and 81 which are connected to act as a voltage divider. Taps of the voltage divider are connected with the inverting inputs of the three differential amplifiers 50, 51 and 80 which operate as comparators. The output signals of the three differential amplifiers 50, 51 and 80 are fed to the input ports of a microprocessor 55 which performs the further signal evaluation and processing. Microprocessor 55 determines either from signal S3 or from signal S4 the direction, the speed, or a value derived therefrom, for example the actual position IP.

A particularly advantageous modification provides for the use of a voltage transformer circuit 43. Voltage transformer circuit 43, whose configuration is known, for example, from the already cited textbook by U. Tietze and Ch. Schenk, increases the voltage present across current supply terminal 44 to a higher value. Current supply terminal 44 is generally at the same potential as the operating voltage terminal 21 for the operating voltage of electric motor 14. Voltage transformer circuit 43 therefore also provides a reliable energy supply to sensor arrangement 15 and magnetic field sensitive elements 33 and 34 if the two switching means 19 and 20 connect the electric motor simultaneously with the first operating voltage terminal 21 so as to short-circuit the motor. Another possibility to ensure the energy supply for sensor arrangement 15, if the two switching means 19 and 20 connect the two connecting lines 16 and 17 simultaneously with operating voltage terminal 21 in order to brake electric motor 14, is to change the polarity of signal line 18. That is, the negative potential is transmitted over the signal line 18 while the positive potential is made available by way of at least one of the two connecting lines 16 or 17. In the embodiment shown in FIG. 1, the polarity of diodes 23 and 24 must be changed, and the first current supply terminal 25 of sensor arrangement 15 must be connected with the cathode terminals of diodes 23 and 24. Moreover, the polarity of the current mirror circuit 42 in evaluation arrangement 13 must be changed. That is, instead of the PNP transistors shown in FIG. 4, NPN transistors are now employed whose emitters are each connected to ground 22. Operating resistor 45 must be connected with current supply terminal 44.

Instead of the comparator arrangement 59 shown in FIG. 4, it is also possible to feed the signal put out by lowpass filter 46 to an analog/digital converter. The advantage of this embodiment is that an analog/digital converter can be employed which might already be available in microprocessor 55. In this embodiment, comparator arrangement 49 may be omitted entirely.

Signal S4, shown in FIG. 5, which is transmitted through signal line 18, has four discrete signal levels P1 to P4. Signal S4 is produced from the addition of speed signal G and direction signal R. In the embodiment shown in FIG. 5, direction signal R has a discrete level twice as high as speed signal G. In the embodiment shown in FIG. 5, signal R is fixed at the positive signal edges of signal H1 as a function of the current level of signal H2. At time T, the direction of movement of the movable component changes. Upon the next positive edge of signal H1 after time T, there then occurs a change in direction signal R. The particular advantage of setting the levels of signals G, which lead to the four different levels P1 to P4 of signal S4, is that evaluation arrangement 13 is able to determine speed signal G and direction signal R without effort from the four different levels P1 to P4.

In the embodiment shown in FIG. 6, the signal S3 transmitted through signal line 18 is transmitted with three different signal levels U, M and O. Signal S3 is also a result of the addition of speed signal G and direction signal R. Speed signal G and direction signal R are no longer shown in FIGS. 6a through 6d. Signal S3 results from the addition of these signals G and R. In dependence on the current movement situation of the movable component, signal S3 may then appear ambiguous compared to signal S4. The middle signal level M may be activated either by speed signal G acting on a current source 37 or 38, respectively, or direction signal R may activate it by acting on the other current source 37 or 38, respectively. This ambiguity does not occur in FIGS. 6a and 6b. There the change in the direction of rotation after time T occurs, in each case, starting either from the upper level O or from the lower level U. The signal level of signal S3 therefore jumps after time T either from the upper level O to the lower level U or vice versa. In the situations shown in FIGS. 6c and 6d, the change in the direction of rotation after time T occurs if signal S3 is at the middle level M. A negative jump in the level of the direction signal just coincides with a positive jump in the level of the speed signal. State M is thus ambiguous. FIGS. 6c to 6d show this not completely defined state in signal S3 as a break in the level after time T indicated as a line. The undefined state occurs only if there is a change in the direction of rotation. Influences on the result in evaluation arrangement 13 should be expected only if evaluation arrangement 13 determines a current actual position of the movable component from the recovered direction signal R and speed signal G. In the situations shown in FIGS. 6c and 6d, such a counting pulse cannot be easily transmitted through signal line 18. If a requirement exists for high accuracy, this lost counting pulse can nevertheless be determined in a process taking place in evaluation arrangement 13. The flow chart for this process is shown in FIG. 7.

The current signal level Z(0) which occurred after the last jump in level of signal S3 is determined in an assignment step 120. In a query step 128 it is determined whether the current signal level Z(0) corresponds to the upper level O. If this is the case, the actual position is determined in assignment step 121 from the previous actual position which is reduced by one counting pulse. The counting pulses correspond to a certain change in position which may be positive or negative. In a query step 129 it is determined whether the last signal level Z(-1) after the penultimate level jump had the middle signal level M. If this is the case, the program jumps to a further query 130 in which it is determined whether the penultimate signal level (Z-2) which occurred after the level jump preceding the penultimate level jump corresponded to the lower level U. If this is also the case, the actual position is reduced in an assignment step 122 to the previous actual position minus one counting pulse. If a negative result appears in query step 129 as well as in query step 130, the program jumps directly to node 135 without assigning any values in 122.

If the result of query 128 is negative, the program jumps to a query 131 in which it is determined whether the current signal level Z(O), which appeared after the last jump in level, correspond to lower level U. If this is the case, an assignment step 123 determines the actual position to be the prior actual position plus one counting pulse. In a subsequent query step 132 it is determined whether the last signal level Z(-1) corresponded to the middle signal level M. If this is the case, it is determined during the next query step 133 whether the penultimate signal level Z(-2), which occurred after the jump in level preceding the penultimate jump in level, corresponded to the upper signal level O. If this was also the case, the actual position is determined in an assignment step 124 as the previous actual position plus one counting pulse. If the answer was negative either in query step 132 or in query step 133, the program jumps directly to node 135 without consideration of assignment step 124.

In the case of a negative decision in query step 131, the program goes to the last query step 134 in which it is determined whether the last signal level Z(-1) after the penultimate jump in level had the upper level O. If this is the case, the actual position is determined in assignment step 125 from the previous actual position minus one counting pulse. If it is not correct, assignment step 126 determines the actual position from the previous actual position plus one counting pulse. After completing assignment steps 125 and 126, the program jumps to node 135.

Node 135 leads to the last assignment step 127 in which signal levels Z(-2) and Z(-1) are brought up to date. The new penultimate signal level Z(-2) results from the currently valid last signal level Z(-1), and the new last signal level Z(-1) results from the currently valid current signal level Z(0). After the occurrence of a new jump in level of signal S3 the detected level U, M or O is assigned to the new current signal level Z(0) in assignment step 120.

The process taking place in evaluation arrangement 13 according to the flow chart shown in FIG. 7 brings about that, if there is a change in direction or the movable component stops moving, with signal S3 at the middle level M, the next change in level is counted double for a determination of the actual position of the movable component. Evaluation arrangement 13 is thus able to always determine the actual position of the movable component with such accuracy as permitted by the resolution of sensor 28.

It will be understood that the above description of the present invention is susceptible to various modifications, changes and adaptations, and the same are intended to be comprehended within the meaning and range of equivalents of the appended claims.

What is claimed is:

1. A device for detecting movement of a movable component, said device comprising:
   a sensor arrangement including
      a first position sensor for outputting a first signal corresponding to a first position range of the movable component,
      a second position sensor for outputting a second signal corresponding to at least a second position range of the movable component, with the two position ranges having an overlapping region,
      signal processing means, to which the first and second signals output by said sensors are fed, for deriving a direction signal and a speed signal based on the first and second signals, with the direction signal and the speed signal each having separate discrete values, and
      means for adding the separate discrete values of the speed and direction signals to form an added signal and for feeding the added signal to a signal line; and
   an evaluation arrangement connected to said signal line for receiving and evaluating the added signal on said signal line for determining a direction and a speed of the movable component.

2. A device according to claim 1, wherein the two discrete values are at least approximately equal.

3. A device according to claim 1, wherein said separate discrete values are different, with one discrete value being at least approximately double the other discrete value.

4. A device according to claim 1, wherein said first and second position sensors are magnetic field sensitive elements.

5. A device according to claim 4, wherein said magnetic field sensitive elements are Hall effect elements.

6. A device for detecting movement of a movable component, said device comprising:
   a sensor arrangement including
      a first position sensor for outputting a first signal corresponding to a first position range of the movable component,
      a second position sensor for outputting a second signal corresponding to at least a second position range of the movable component, with the two position ranges having an overlapping region,
      signal processing means, to which the first and second signals output by said sensors are fed, for deriving a direction signal and a speed signal based on the first and second signals, with the direction signal and the speed signal each having separate discrete values, and
      means for adding the separate discrete values of the speed and direction signals to form an added signal and for feeding the added signal to a signal line; and
   an evaluation arrangement connected to said signal line for receiving and evaluating the added signal on said signal line for determining a direction and a speed of the movable component,
   wherein said means for adding and for feeding includes first and second respective controlled current sources, each connected to and impressing a predetermined current into the signal line.

7. A device according to claim 6, wherein said evaluation arrangement includes a current mirror circuit that is connected with the signal line.

8. A device according to claim 6, wherein said evaluation arrangement includes a circuit means for increasing the voltage across the signal line that is connected with the signal line.

9. A device according to claim 5, wherein the Hall effect elements, the signal processing means and the current sources are included in an integrated circuit.

10. A device according to claim 1, further comprising switch means for switching a supply of energy for said position sensors in a periodic time interval.

11. A device according to claim 1, wherein an electric motor is connected to drive the movable component and is provided with connecting lines for supplying energy, and wherein the sensor arrangement is supplied with energy through said signal line as well as by way of at least one of the connecting lines leading to the electric motor.

12. A device according to claim 1, wherein an electric motor is provided to drive the movable component and is provided with connecting lines for supplying energy, and wherein the sensor arrangement is supplied with energy by way of two of the connecting lines leading to the electric motor.

13. A device according to claim 1, used in an adjustment drive disposed in a motor vehicle.

* * * * *